(12) United States Patent
Morioka et al.

(10) Patent No.: US 8,354,137 B2
(45) Date of Patent: Jan. 15, 2013

(54) MANUFACTURING METHOD OF ELECTRODE CATALYST LAYER FOR FUEL CELL

(75) Inventors: Hiroyuki Morioka, Tokyo (JP); Haruna Kurata, Tokyo (JP); Saori Okada, Tokyo (JP); Kenichiro Oota, Kanagawa (JP)

(73) Assignee: Toppan Printing Co., Ltd. (JP)

( * ) Notice: Subject to any disclaimer, the term of this patent is extended or adjusted under 35 U.S.C. 154(b) by 0 days.

(21) Appl. No.: 13/228,306

(22) Filed: Sep. 8, 2011

(65) Prior Publication Data

US 2011/0318482 A1    Dec. 29, 2011

Related U.S. Application Data

(63) Continuation of application No. PCT/JP2010/054375, filed on Mar. 16, 2010.

(30) Foreign Application Priority Data

Jun. 29, 2009  (JP) ................. 2009-153485
Aug. 6, 2009   (JP) ................. 2009-183296

(51) Int. Cl.
   *H01M 4/88*    (2006.01)
   *H01M 4/86*    (2006.01)
   *H01M 4/90*    (2006.01)
   *H01M 8/10*    (2006.01)

(52) U.S. Cl. .......... 427/115; 427/58; 427/180; 427/201; 427/215; 427/217; 429/479; 429/480; 429/481; 429/482; 429/483; 429/484; 429/485; 429/487; 429/491; 429/492

(58) Field of Classification Search .................. None
See application file for complete search history.

(56) References Cited

U.S. PATENT DOCUMENTS

| 5,723,173 | A  | * | 3/1998  | Fukuoka et al. | ............. | 427/115 |
| 5,728,485 | A  | * | 3/1998  | Watanabe et al.| ............. | 429/484 |
| 2002/0182478 | A1 | * | 12/2002 | Uchida et al.  | ............. | 429/44  |
| 2005/0064276 | A1 | * | 3/2005  | Sugawara et al.| ............. | 429/42  |

FOREIGN PATENT DOCUMENTS

| JP | 64-062489 | 3/1989 |
| JP | 02-082456 | 3/1990 |

(Continued)

OTHER PUBLICATIONS

A. Ishihara, et al., "Partially Oxidized Tantalum Carbonitrides as a New Nonplatinum Cathode for PEFC-1-", Journal of the Electrochemical Society, 2008, vol. 155, No. 4, pp. B400-B406.

(Continued)

*Primary Examiner* — Nathan Empie
*Assistant Examiner* — Lisha Jiang
(74) *Attorney, Agent, or Firm* — Squire Sanders (US) LLP

(57) ABSTRACT

The present invention provides a method for manufacturing an electrode catalyst layer for a fuel cell which includes a polymer electrolyte, a catalyst material and carbon particles, wherein the electrode catalyst layer employs a non-precious metal catalyst and has a high level of power generation performance. The electrode catalyst layer is used as a pair of electrode catalyst layers in a fuel cell in which a polymer electrolyte membrane is interposed between the pair of the electrode catalyst layers which are further interposed between a pair of gas diffusion layers. The method of the present invention has such a feature that the catalyst material or the carbon particles are preliminarily embedded in the polymer electrolyte.

9 Claims, 3 Drawing Sheets

FOREIGN PATENT DOCUMENTS

| | | |
|---|---|---|
| JP | 05-036418 | 2/1993 |
| JP | 07-254419 | 10/1995 |
| JP | 2005-044659 | 2/2005 |
| JP | 2005-063677 | 3/2005 |
| JP | 2008-135369 | 6/2008 |
| JP | 2008234910 A * | 10/2008 |
| JP | 2008-270176 | 11/2008 |

OTHER PUBLICATIONS

Translations of the International Preliminary Report on Patentability mailed Feb. 23, 2012, for related International Patent Application No. PCT/JP2010/054375, Filed Mar. 16, 2010, 8 pp.

* cited by examiner

MANUFACTURING METHOD OF ELECTRODE CATALYST LAYER FOR FUEL CELL

This application is a continuation of International Application Number PCT/JP2010/054375, filed on Mar. 16, 2010, which is incorporated herein by reference in its entirety.

BACKGROUND OF THE INVENTION

1. Field of the Invention

The present invention relates to an electrode catalyst layer, a membrane electrode assembly and a fuel cell which include the electrode catalyst layer and a manufacturing method of the electrode catalyst layer. More specifically, the present invention relates to a manufacturing method of an electrode catalyst layer which uses a non-precious metal catalyst (or a non-platinum catalyst) and has a high power generation performance, such an electrode catalyst layer, a membrane electrode assembly and a fuel cell which include such an electrode catalyst layer.

2. Description of the Related Art

A fuel cell is a power generation system which produces electric power along with heat. A fuel gas including hydrogen and an oxidant gas including oxygen react together at electrodes containing catalyst in a fuel cell so that a reverse reaction of water electrolysis takes place. A fuel cell is attracting attention as a clean energy source of the future because of advantages such as high efficiency, a small impact on the environment and a low level of noise relative to conventional power generation systems. A fuel cell is classified into several types according to an ion conductor employed therein. A fuel cell which uses a proton-conductive polymer membrane is called a proton exchange membrane fuel cell (PEMFC), or a polymer electrolyte fuel cell (PEFC).

Among various fuel cells, a PEMFC (or PEFC), which can be used at around room temperature, is considered as a promising fuel cell for use in vehicles and household stationary power supply etc. and is being developed widely in recent years. In the PEMFC (or PEFC), a joint unit which has a pair of electrode catalyst layers on both sides of a polymer electrolyte membrane and is called a membrane electrode assembly (MEA) is arranged between a pair of separators, on each of which either a gas flow path for supplying a fuel gas including hydrogen to one of the electrodes or a gas flow path for supplying an oxidant gas including oxygen to the other electrode is formed. The electrode for supplying a fuel gas is called a fuel electrode or anode electrode whereas the electrode for supplying an oxidant gas is called an air electrode or cathode electrode. In general, each of these electrodes includes an electrode catalyst layer, in which a polymer electrolyte(s) and carbon particles on which a catalyst such as a noble metal of platinum group is loaded are stacked, and a gas diffusion layer which has gas permeability and electron conductivity.

Apart from other problems such as improving durability and output density etc., cost reduction is the most major problem for putting the PEMFC (or PEFC) into practical use.

Since the PEMFC (or PEFC) employs expensive platinum as the electrode catalyst at present, an alternate catalyst material is strongly desired to fully promote the PEMFC (or PEFC). As more platinum is used in the air electrode than in the fuel electrode, an alternative to platinum (namely, a non-precious metal catalyst) with a high level of catalytic performance for oxygen-reduction on the air electrode is, in particular, well under development.

A mixture of a noble metal and nitride of iron (a transition metal) described in Patent document 1 is an example of a non-precious metal catalyst for the air electrode (or oxygen electrode). In addition, a nitride of molybdenum (a transition metal) described in Patent document 2 is another example. These catalyst materials, however, have only an insufficient catalytic performance for oxygen-reduction and are dissolved in some cases in an acidic electrolyte.

On the other hand, Non-patent document 1 reports that a partially-oxidized tantalum carbonitride has both excellent stability and catalytic performance. It is true that this oxide type non-precious metal catalyst has a high level of catalytic performance for oxygen-reduction in itself but it remains necessary to find out an appropriate method to make it into the electrode catalyst layer because it is not loaded on carbon particles unlike platinum catalyst.

Moreover, Patent document 3 describes an MEA employing a non-precious metal catalyst. In Patent document 3, however, there is such a problem that a method to make the non-precious metal catalyst into an electrode catalyst layer is not suitable for non-precious metal catalyst since it is only a method which is described, for example, in Patent document 4 and Patent document 5 etc. and is conventionally used for platinum catalyst.

<Patent document 1>: JP-A-2005-044659.
<Patent document 2>: JP-A-2005-063677.
<Patent document 3>: JP-A-2008-270176.
<Patent document 4>: JP-A-H2-048632.
<Patent document 5>: JP-A-H5-036418.
<Non-patent document 1>: "Journal of The Electrochemical Society", Vol. 155, No. 4, pp. B400-B406 (2008).

SUMMARY OF THE INVENTION

The present invention provides a manufacturing method of an electrode catalyst layer which has a high level of power generation performance by using a non-precious metal catalyst (or a non-precious metal oxide based catalyst) as a catalyst material.

After eager research to solve various problems, the inventors completed the present invention.

A first aspect of the present invention is a method for manufacturing an electrode catalyst layer of a fuel cell, the electrode catalyst layer having a catalyst material, carbon particles, a first polymer electrolyte and a second polymer electrolyte, a specific surface area of the catalyst material being smaller than a specific surface area of said carbon particles, the method including:

(1): preparing a first catalyst ink, in which the first polymer electrolyte and the catalyst material are dispersed in a solvent, or otherwise, preparing a first catalyst ink, in which the first polymer electrolyte and the carbon particles are dispersed in a solvent;

(2): drying the first catalyst ink to make a "catalyst material embedded in the first polymer electrolyte", or otherwise, drying the first catalyst ink to make "carbon particles embedded in the first polymer electrolyte";

(3): preparing a second catalyst ink, in which the "catalyst material embedded in the first polymer electrolyte", the carbon particles and the second polymer electrolyte are dispersed in a solvent, or otherwise, preparing a second catalyst ink, in which the "carbon particles embedded in the first polymer electrolyte", the catalyst material and the second polymer electrolyte are dispersed in a solvent; and (4): coating the second catalyst ink on a substrate which is a gas diffusion layer, a transfer sheet or a polymer electrolyte membrane so as to fabricate the electrode catalyst layer.

A second aspect of the present invention is the method according to the first aspect of the present invention, wherein a ratio by weight between the catalyst material and the first polymer electrolyte in the "catalyst material embedded in the first polymer electrolyte" is in the range of 1:0.01 to 1:30, or otherwise, a ratio by weight between the carbon particles and the first polymer electrolyte in the "carbon particles embedded in the first polymer electrolyte" is in the range of 1:0.1 to 1:20 in the above described (2).

A third aspect of the present invention is the method according to the second aspect of the present invention, wherein the drying the first catalyst ink in the above described (2) is performed at a temperature in the range of 30-140° C.

A fourth aspect of the present invention is the method according to the third aspect of the present invention further including in the above described (3):

(A): preliminarily mixing together the carbon particles with the "catalyst material embedded in the first polymer electrolyte" without adding a solvent, or otherwise, preliminarily mixing together the catalyst material with the "carbon particles embedded in the first polymer electrolyte" without adding a solvent.

A fifth aspect of the present invention is the method according to the fourth aspect of the present invention further including in the above described (3):

(B): heating the carbon particles and the "catalyst material embedded in the first polymer electrolyte", which have been mixed together in the above described (A), at a temperature in the range of 50-180° C., or otherwise, heating the catalyst material and the "carbon particles embedded in the first polymer electrolyte", which have been mixed together in the above described (A), at a temperature in the range of 50-180° C.

A sixth aspect of the present invention is the method according to the fifth aspect of the present invention, wherein the catalyst material is a positive electrode material which is used as oxygen electrode of a PEMFC, and includes at least one transition metal element selected from the group consisting of Ta, Nb, Ti and Zr.

A seventh aspect of the present invention is the method according to the sixth aspect of the present invention, wherein the catalyst material is a partially-oxidized carbonitride of the at least one transition metal element.

An eighth aspect of the present invention is the method according to the seventh aspect of the present invention, wherein the catalyst material includes Ta.

In accordance with the present invention, it is possible to improve output performance of an electrode catalyst layer which includes a polymer electrolyte, a catalyst material and carbon particles by embedding (and/or implanting, coating, covering etc.) the catalyst material which has a specific surface area smaller than that of the carbon particles preliminarily in the polymer electrolyte so as to increase active reaction sites by improving proton conductivity on a surface of the catalyst. The present invention provides a manufacturing method of such an electrode catalyst layer, as well as such an electrode catalyst layer, an MEA and a fuel cell including the same.

In addition, the present invention includes a treatment in which carbon particles with a specific surface area larger than a specific surface area of a catalyst material is preliminarily embedded in (and/or implanted into, covered with, coated with etc.) a polymer electrolyte so that the specific surface area of the carbon particles is reduced. It is possible to increase proton conductivity on a surface of the catalyst material when forming the electrode catalyst layer by controlling the specific surface area of carbon particles. As a result, it is possible to provide a manufacturing method of an electrode catalyst layer in which active reaction sites increase and an output performance is improved, as well as an electrode catalyst layer, an MEA and a fuel cell including the same.

DESCRIPTION OF NUMERALS

Figure 1:
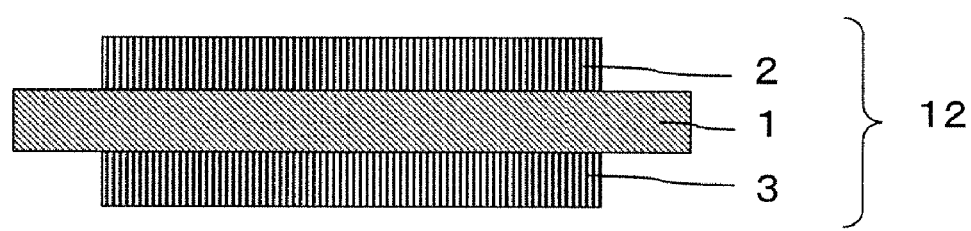
FIG. 1 is a cross sectional exemplary diagram of a membrane electrode assembly of the present invention.

1: Polymer electrolyte membrane
2: Electrode catalyst layer
3: Electrode catalyst layer
12: Membrane electrode assembly (MEA)
4: Gas diffusion layer
5: Gas diffusion layer
6: Air electrode (Cathode electrode)
7: Fuel electrode (Anode electrode)
8: Gas flow path
9: Cooling water flow path
10: Separator

PREFERRED EMBODIMENT OF THE INVENTION

An MEA of an embodiment of the present invention is described below. Embodiments of the present invention are not fully limited to the embodiment of the present invention described below since the embodiment can be modified, redesigned, changed, and/or added with details etc. according to any knowledge of a person in the art so that the scope of the embodiment of the present invention is expanded.

FIG. 1 illustrates a concise cross section diagram of an MEA 12 of an embodiment of the present invention. The MEA 12 of the embodiment of the present invention has a polymer electrolyte membrane 1, an electrode catalyst layer (of the air electrode) 2 on a surface of the polymer electrolyte membrane 1, and an electrode catalyst layer (of the fuel electrode) 3 on the other surface of the polymer electrolyte membrane 1, as is shown in FIG. 1.

Figure 2:
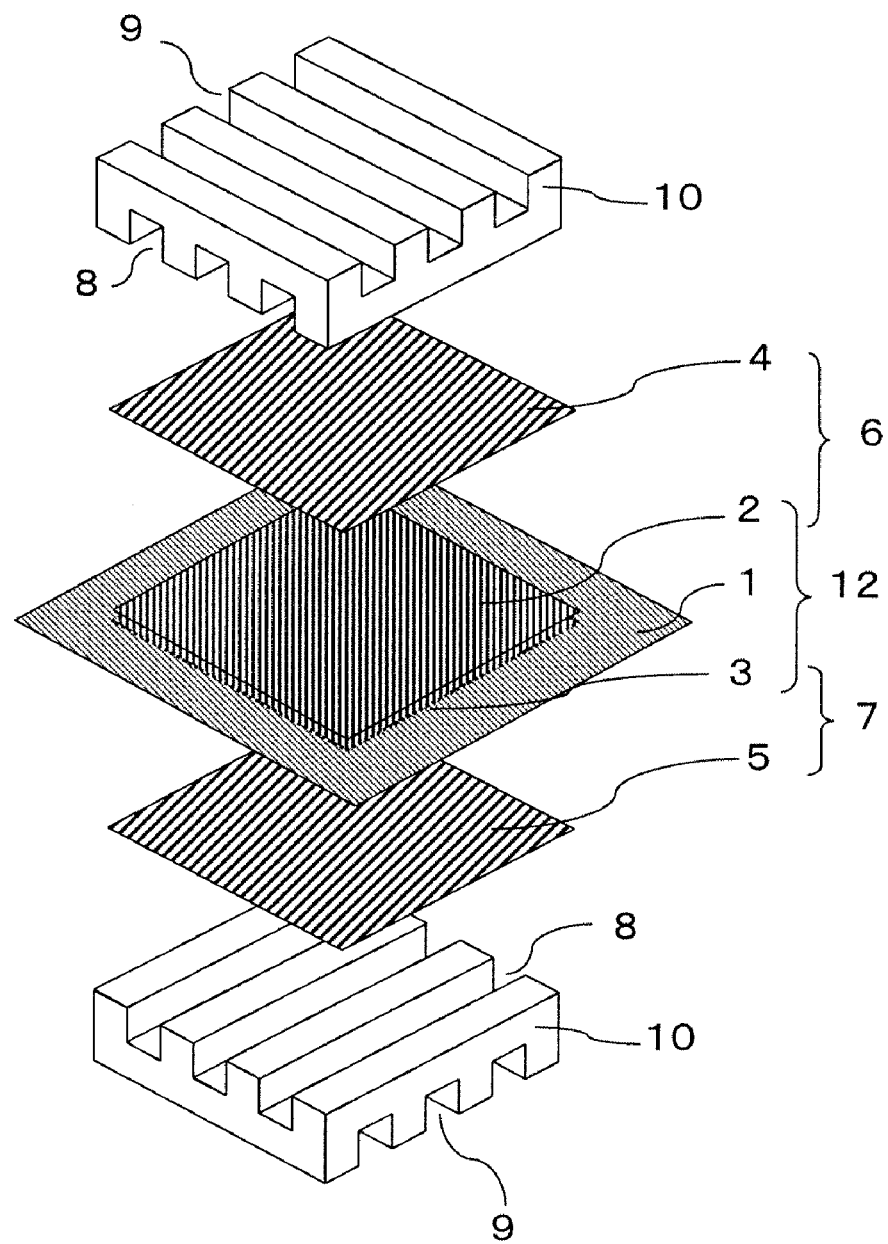
FIG. 2 is an exploded exemplary diagram of a fuel cell of the present invention.

FIG. 2 illustrates an exploded exemplary diagram of a fuel cell 12 of an embodiment of the present invention. In the fuel cell, a gas diffusion layer (of the air electrode) 4 and a gas diffusion layer (of the fuel electrode) 5 are arranged facing the electrode catalyst layer (of the air electrode) 2 and electrode catalyst layer (of the fuel electrode) 3, respectively. Both the air electrode (cathode electrode) 6 and the fuel electrode (anode electrode) 7 has such a structure. Moreover, a pair of separators 10 is arranged in the fuel cell, wherein each separator 10 is made of a conductive and impermeable material and has a gas flow path 8 for transporting a gas on one surface and a cooling water path 9 for transporting cooling water on the opposite surface. A fuel gas such as hydrogen gas for example, is supplied through the gas flow path 8 on the separator 10 of the fuel electrode 7 whereas an oxidant gas such as a gas containing oxygen for example, is supplied through the gas flow path 8 on the separator 10 of the air electrode 6. Then, an electromotive force is generated between the fuel electrode 7 and the air electrode 6 by an electrode reaction between hydrogen as the fuel gas and the oxygen gas under the presence of the catalyst.

The fuel cell illustrated in FIG. 2 is one of a so-called "unit cell structured fuel cell", in which the polymer electrolyte membrane 1, the electrode catalyst layers 2 and 3, and the gas diffusion layers 4 and 5 are interposed between the pair of separators 10, while the present invention also includes a fuel cell in which a plurality of unit cells are stacked via the separator 10.

In a manufacturing method of an electrode catalyst layer of the present invention, it is possible to increase active reaction sites by embedding (and/or implanting, coating, covering etc.) a catalyst material which has a specific surface area smaller than that of carbon particles in a polymer electrolyte in order to increase proton conductivity on a surface of the catalyst material. In the conventional manufacturing method, in which the catalyst material is not specifically embedded in (and/or implanted into, covered with, coated with etc.) a polymer electrolyte, carbon particles which have a larger specific surface area are dominantly embedded in (and/or implanted into, covered with, coated with etc.) a polymer electrolyte when the electrode catalyst layer is formed. As a result, proton conductivity on the surface of the catalyst material is so low that it is impossible to increase active reaction sites. In addition, it is yet possible to improve proton conductivity on the surface of the catalyst material even in the case of the conventional manufacturing method if a highly concentrated polymer electrolyte is used, while it adversely becomes difficult to improve output performance because the polymer electrolyte is excessively added with respect to carbon particles.

In the case where a catalyst material is specifically embedded in (and/or implanted into, covered with, coated with etc.) a polymer electrolyte wherein the catalyst material has a specific surface area smaller than that of carbon particles, it is possible, in a process of preparing a first catalyst ink in which the catalyst material and a first polymer electrolyte is dispersed in a solvent, to adjust a weight ratio (=ratio by weight) of the catalyst material to the polymer electrolyte (after the formation by drying) by controlling a composition of the first ink. It is preferable that the weight ratio of the catalyst material to the polymer electrolyte is in the range of 1:0.01 to 1:30. In the case where the ratio by weight of the polymer electrolyte to the catalyst material is less than 0.01, the output performance may not be improved because proton conductivity on the surface of the catalyst material is almost unchanged and active reaction sites hardly increase. On the other hand, in the case where the ratio by weight of the polymer electrolyte to the catalyst material is more than 30, the output performance may not be improved because gas diffusion to the active reaction sites is inhibited.

In addition, in the case where the catalyst material is specifically embedded in (and/or implanted into, covered with, coated with etc.) the polymer electrolyte wherein the catalyst material has a specific surface area smaller than that of carbon particles, it is preferable that the process of drying the first catalyst ink is carried out at a temperature in the range of 30-140° C. In the case where the drying temperature is under 30° C., the polymer electrolyte in which the catalyst material is implanted (and/or immersed, covered, coated etc.) dissolves so much into the solvent in a process of preparing a second catalyst ink that the output performance of the resultant electrode catalyst layer may be insufficient. On the other hand, in the case where the drying temperature is over 140° C., the polymer electrolyte in which the catalyst material is implanted (and/or immersed, covered, coated etc.) has such inhibited proton conductivity that the output performance of the resultant electrode catalyst layer may be insufficient.

In addition, in the case where the catalyst material is specifically embedded in (and/or implanted into, covered with, coated with etc.) the polymer electrolyte wherein the catalyst material has a specific surface area smaller than that of carbon particles, in the process of preparing the second catalyst ink in which a second polymer electrolyte, carbon particles, and the catalyst material which is embedded in (and/or implanted into, covered with, coated with etc.) a first polymer electrolyte, are dispersed in the solvent, it is preferable that a process of mixing the carbon particles and the catalyst material which is implanted in the first polymer electrolyte together without any solvent is arranged before these are dispersed in the solvent. Unless this process of mixing the carbon particles and the implanted catalyst material is arranged, the output performance may not be improved because it is difficult to increase the active reaction sites due to poor contacts between the catalyst material and the carbon particles.

In addition, in such a case, it is further preferable that a process of heat treatment is performed after the process of mixing without any solvent. The active reaction sites may decrease unless this heat treatment is performed in the process of preparing the second catalyst ink. It is preferable that the heat treatment is performed at a temperature in the range of 50-180° C. In the case where the drying temperature is lower than 50° C., because the polymer electrolyte in which the catalyst material is implanted (and/or immersed, covered, coated etc.) dissolves so much into the solvent in the process of preparing the second catalyst ink and the active reaction sites decrease, the output performance of the resultant electrode catalyst layer may not be improved. In the case where the drying temperature exceeds 180° C., the output performance may also not be improved due to an inhibition of conducting protons.

In addition, it is possible in the manufacturing method of the electrode catalyst layer of the present invention to reduce specific surface area of the carbon particles which have a specific surface area larger than that of a catalyst material by embedding (and/or implanting, coating, covering etc.) the carbon particles preliminarily in the polymer electrolyte. In contrast, in the conventional manufacturing method (of the electrode catalyst layer), in which the carbon particles are not preliminarily embedded in (and/or implanted into, covered with, coated with etc.) the polymer electrolyte, carbon particles which have larger specific surface area are dominantly embedded in (and/or implanted into, covered with, coated with etc.) the polymer electrolyte when the electrode catalyst layer is formed. As a result, proton conductivity on the surface of the catalyst material becomes so low that it is impossible to increase active reaction sites.

In the case where the carbon particles which have a specific surface area larger than that of a catalyst material is preliminarily embedded in (and/or implanted into, covered with, coated with etc.) the polymer electrolyte as is previously described, a ratio by weight between the carbon particles and the polymer electrolyte after drying can be controlled by a composition of a first ink when preparing the fist ink, in which carbon particles and a first polymer electrolyte are dissolved in a solvent. It is preferable that the ratio by weight between the carbon particles and the polymer electrolyte is in the range of 1:0.1 to 1:20. If the ratio by weight of the polymer electrolyte to the carbon particles is less than 0.1, the output performance may not be improved because of a difficulty to reduce specific surface area of the carbon particles. On the other hand, if the ratio by weight of the polymer electrolyte to the carbon particles exceeds 20, which means an excessive addition of the polymer electrolyte with respect to the carbon particles, gas diffusion to the active reaction points is so inhibited that the output performance may not be improved.

In addition, in the case where the carbon particles which have a specific surface area larger than that of a catalyst material is preliminarily embedded in (and/or implanted into, covered with, coated with etc.) the polymer electrolyte, it is preferable that a drying process of the first ink, in which the carbon particles and the first polymer electrolyte is dissolved in the solvent, is performed at a temperature in the range of 30-140° C. If the temperature for drying is lower than 30° C., the output performance may not be improved because the polymer electrolyte in which the carbon particles are embedded is excessively dissolved in a solvent in a process of preparing a second catalyst ink. On the other hand, if the temperature for drying is higher than 140° C., the output performance may not be improved because proton conduction in the polymer electrolyte in which the carbon particles are embedded is inhibited.

In addition, in the case where the carbon particles which have a specific surface area larger than that of a catalyst material is preliminarily embedded in (and/or implanted into, covered with, coated with etc.) the polymer electrolyte, it is preferable that a process of preparing the second ink, in which the carbon particles which are embedded in the first polymer electrolyte, the catalyst material and a second polymer electrolyte are dispersed in a solvent, includes a process in which the catalyst material and the carbon particles embedded in the polymer electrolyte are mixed together without solvent before a process of dispersing them into the solvent. If this process of mixing without solvent is not arranged, the output performance may not be improved because contacts between the carbon particles and the catalyst material are insufficient and thus the active reaction points hardly increase.

In addition, it is further preferable in the case described above that a process of heat treatment is performed after the process of mixing without solvent. Absence of this heat treatment may cause a decrease of the active reaction points in preparing the second catalyst ink. It is preferable that the heat treatment is performed at a temperature in the range of 50-180° C. In the case where the temperature is lower than 50° C., the polymer electrolyte embedding the carbon particles may excessively dissolve in the solvent in preparing the second catalyst ink, thereby causing a decrease in active reaction points and adversely affecting the output performance. On the other hand, in the case where the temperature is higher than 180° C., proton conductivity of the polymer electrolyte embedding the carbon particles may be inhibited thereby the output performance is not improved.

A generally used catalyst material can be applied as the catalyst material for the embodiment of the present invention. It is preferable in the present invention to use a material which contains at least one transition metal arbitrary selected from Ta, Nb, Ti and Zr, which can be used as a platinum-alternate material in an air electrode as a cathode of a PEMFC.

In addition, a material obtained by a partial oxidation of carbonitrides of these transition metals under an atmosphere including oxygen can be more preferably used.

A specific example is a material TaCNO, which is obtained by a partial oxidation of carbonitride of tantalum (TaCN) in an atmosphere including oxygen, and which has a specific surface area in the range of 1-20 $m^2/g$.

Any carbon which has a shape of particulate and chemically resistant to the catalyst, for example, carbon black, graphite, black lead, active carbon, carbon fiber, carbon nanotube and fullerene etc. can be used as the carbon particles of the embodiment of the present invention. It is preferable that the carbon particles have a particle-diameter in the range of 10-1000 nm. An electron conduction path is hardly formed if the particle is too small whereas gas diffusion in an electrode catalyst layer decreases and catalyst efficiency may decrease if the particle is too large.

A membrane electrode assembly and a fuel cell of the embodiment of the present invention are described below.

Any polymer electrolyte membrane which has protonic conduction, specifically, a fluoropolymer electrolyte or a carbon hydride polymer electrolyte etc. can be used as the polymer electrolyte membrane of the embodiment of the present invention. Nafion® made by DuPont, Flemion® made by Asahi Glass Co., Ltd., Aciplex® made by Asahi Kasei Corporation and GORE-SELECT® made by Gore & Associates Inc. etc. are examples of the fluoropolymer electrolyte and can be used. Sulfonated poly(ether ketone)s, sulfonated polyethersulfone, sulfonated poly(ether ether sulfone), sulfonated polysulfide, and polyphenylene sulfonate etc. can be used as the carbon hydride polymer electrolyte. Among these, Nafion® made by DuPont is preferably used.

The polymer electrolyte contained in the catalyst ink of this embodiment of the present invention should have protonic conduction and a fluoropolymer electrolyte or a carbon hydride polymer electrolyte which is used as the polymer electrolyte membrane described above can also be used as such a polymer electrolyte. Nafion® made by DuPont can be used as the fluoropolymer electrolyte. Sulfonated poly(ether ketone)s, sulfonated polyethersulfone, sulfonated poly(ether ether sulfone), sulfonated polysulfide, and polyphenylene sulfonate etc. can be used as the carbon hydride polymer electrolyte. Among these, Nafion® made by DuPont, is preferably used. Considering adhesiveness between the electrode catalyst layer and the polymer electrolyte membrane, it is preferable that a polymer electrolyte material identical to the polymer electrolyte membrane is used in the catalyst ink.

In addition, the polymer electrolyte of the present invention, that is, both the first polymer electrolyte which embeds the catalyst material or the carbon particles and the second polymer electrolyte which is admixed with the catalyst material or the carbon particles embedded in the first polymer electrolyte, may be the same material but it is not necessary.

It is possible to use a solvent in which the polymer electrolyte can be dispersed with high fluidity and yet the catalyst particles and the polymer electrolyte do not corrade as a dispersant of the catalyst ink. It is preferable that the dispersant includes a volatile organic solvent. Alcohols such as methanol, ethanol, 1-propanol, 2-propanol, 1-butanol, 2-butanol, isobutyl alcohol, tert-butyl alcohol and pentanol etc., ketone solvents such as acetone, methyl ethyl ketone, pentanone, methyl isobutyl ketone, heptanone, cyclohexanone, methyl cyclohexanone, acetonyl acetone and diisobutyl ketone etc., ether solvents such as tetrahydrofuran, dioxane, diethylene glycol dimethyl ether, anisole, methoxytoluene and dibutyl ether etc., and other polar solvents such as dimethylformamide, dimethylacetamide, N-methylpyrrolidone, ethylene glycol, diethylene glycol, diacetone alcohol and 1-methoxy-2-propanol etc. are often used although the dispersant is not limited to these. In addition, any solvent mixture of a combination of a plurality of these examples also may be used.

In addition, the solvent in which lower alcohol is used has a high risk of firing. When such a solvent is used, the solvent is preferably used as a mixture with water since water which is highly soluble in the polymer electrolyte can be contained without serious problems. There is no particular limitation to a water additive amount unless the water is separated from the polymer electrolyte to generate white turbidity or turn into a gel.

The catalyst ink may include a dispersant in order to disperse the catalyst material and/or the carbon particles. Anion surfactant, cation surfactant, ampholytic surfactant and nonionic surfactant etc. can be used as the dispersant.

Specifically, for example, carboxylate type surfactants such as alkyl ether carboxylates, ether carboxylates, alkanoyl sarcosines, alkanoyl glutaninates, acyl glutaninates, N-methyl taurine-oleic acid condensate, potassium oleate diethanolamine salts, alkyl ether sulfate triethanolamine salts, polyoxyethylene alkyl ether sulfate triethanolamine salts, amine salts of specialty modified polyether ester acids, amine salts of higher fatty acid derivatives, amine salts of specialty modified polyester acids, amine salts of large molecular weight polyether ester acids, amine salts of specialty modified phosphate esters, amideamine salts of large molecular weight polyether ester acids, amide-amine salts of specialty aliphatic acid derivatives, alkylamine salts of higher fatty acids, amide-amine salts of large molecular weight polycarboxylic acids, sodium laurate, and sodium stearate, sodium oleate etc., sulfonate type surfactants such as dialkylsulfosuccinates, salts of 1,2-bis(alkoxycarbonyl)-1-ethanesulfonic acid, alkylsulfonates, paraffin sulfonates, alpha-olefin sulfonates, linear alkylbenzene sulfonates, alkylbenzene sulfonates, polynaphthylmethane sulfonates, naphthalenesulfonate-formaline condensates, alkylnaphthalene sulfonates, alkanoylmethyl taurides, sodium salt of lauryl sulfate ester, sodium salt of cetyl sulfate ester, sodium salt of stearyl sulfate ester, sodium salt of oleyl sulfate ester, lauryl ether sulfate ester salt, sodium alkylbenzene sulfonates, and oil-soluble alkylbenzene sulfonates etc., sulfate ester type surfactants such as alkylsulfate ester salts, alkyl sulphates, alkyl ether sulphates, polyoxyethylene alkyl ether sulfates, alkyl polyethoxy sulfates, polyglycol ether sulfates, alkyl polyoxyethylene sulfates, sulfonate oil, and highly sulfonated oil etc., phosphate ester type surfactants such as monoalkyl phosphates, dialkyl phosphates, monoalkyl phosphate esters, dialkyl phosphate esters, alkyl polyoxyethylene phosphates, alkyl ether phosphates, alkyl polyethoxy phosphates, polyoxyethylene alkyl ethers, alkylphenyl polyoxyethylene phosphate, alkylphenyl ether phosphates, alkylphenyl polyethoxy phosphates, polyoxyethylene alkylphenylether phosphates, disodium salts of higher alcohol phosphate monoester, disodium salts of higher alcohol phosphate diester, and zinc dialkyl dithiophosphate etc. can be used as the anion surfactant mentioned above.

For example, benzyldimethyl[2-{2-(p-1,1,3,3-tetramethylbutylphenoxy)ethoxy}ethyl]ammonium chloride, octadecylamine acetate, tetradecylamine acetate, octadecyltrimethylammonium chloride, beef tallow trimethylammonium chloride, dodecyltrimethylammonium chloride, palm trimethylammonium chloride, hexadecyltrimethylammonium chloride, behenyltrimethylammonium chloride, palm dimethylbenzylammonium chloride, tetradecyldimethylbenzylammonium chloride, octadecyldimethylbenzylammonium chloride, dioleyldimethylammonium chloride, 1-hydroxyethyl-2-beef tallow imidazoline quaternary salt, 2-heptadecenyl-hydroxyethyl imidazoline, stearamideethyldiethylamine acetate, stearamideethyldiethylamine hydrochloride, triethanolamine monostearate formate, alkylpyridium salts, higher alkylamine-ethylene oxide adducts, polyacrylamide amine salts, modified polyacrylamide amine salts, and perfluoroalkyl quaternary ammonium iodide etc. can be used as the cation surfactant stated above.

For example, dimethyl cocobetaine, dimethyl lauryl betaine, sodium laurylaminoethyl glycine, sodium laurylaminopropionate, stearyl dimethyl betaine, lauryl dihydroxyethyl betaine, amide betaine, imidazolinium betaine, lecithin, sodium 3-(ω-fluoroalkanoyl-N-ethylamino)-1-propane sulfonate, and N-{3-(perfluorooctanesulfoneamide)propyl}-N, N-dimethyl-N-carboxymethylene ammonium betaine etc. can be used as the zwitterionic surfactant mentioned above.

For example, coconut fatty acid diethanolamide (1:2 type), coconut fatty acid diethanolamide (1:1 type), beef tallowate diethanolamide (1:2 type), beef tallowate diethanolamide (1:1 type), oleic acid diethanolamide (1:1 type), hydroxyethyl laurylamine, polyethylene glycol laurylamine, polyethylene glycol cocoamine, polyethylene glycol stearylamine, polyethylene glycol beef tallow amine, polyethylene glycol beef tallow propylenediamine, polyethylene glycol dioleylamine, dimethyllaurylamine oxide, dimethylstearylamine oxide, dihydroxyethyllaurylamine oxide, perfluoroalkylamine oxides, polyvinylpyrrolidone, higher alcohol-ethylene oxide adducts, alkyl phenol-ethylene oxide adducts, fatty acid-ethylene oxide adducts, propylene glycol-ethylene oxide adduct, fatty acid esters of glycerin, fatty acid esters of pentaerithritol, fatty acid esters of sorbitol, fatty acid esters of sorbitan, and fatty acid esters of sugar etc. can be used as the nonionic surfactant mentioned above.

Among these surfactants above, sulfonate type surfactants such as alkylbenzene sulfonic acids, α-olefin sulfonic acids, sodium alkylbenzene sulfonates, oil soluble alkylbenzene sulfonates, and α-olefin sulfonates are preferable considering the dispersion performance of the dispersing agent and the influences of a residual dispersing agent on the catalyst efficiency etc.

The catalyst ink receives dispersion treatment if necessary. It is possible to control the particles size and the catalyst ink viscosity by the dispersion treatment conditions. The dispersion treatment can be performed with various types of equipment. The dispersion treatment may include, for example, a treatment by a ball mill, a roll mill, a shear mill, or a wet mill and an ultrasonic dispersion treatment etc. In addition, it may also include a treatment by a homogenizer, in which stirring by a centrifugal force is performed.

The amount of the solid content in the catalyst ink is preferred to be in the range of 1-50% by weight. In the case where the amount of the solid content is too large, cracks tend to easily occur on the surface of the electrode catalyst layer since the viscosity of the catalyst ink becomes too high. On the other hand, in the case where the amount of the solid content is too small, the forming rate of the catalyst layer becomes too low to retain appropriate productivity. The solid content mainly includes the catalyst material, the carbon particles and the polymer electrolyte. The larger the amount of carbon particles is included, the higher the viscosity of the ink becomes even when the total amount of the solid content is unchanged. If the amount of carbon particles decreases, the viscosity also falls accordingly. Thus, it is preferable that the ratio of the carbon particles to the total solid content is adjusted within the range of 10-80% by weight. In addition, it is preferable that the viscosity of the catalyst ink is in the range of 0.1-500 cP (more preferably in the range of 5-100 cP). It is possible to control the viscosity by adding a dispersant when dispersing the catalyst ink.

In addition, the catalyst ink may include a pore forming agent. Fine pores are created by removing this agent after the electrode catalyst is formed. Examples of the pore forming agent are materials soluble in acid, alkali or water, sublimation materials such as camphor, and materials which decompose by heat. If the pore former is soluble in warm water, it may be removed by water produced during the power generation.

Inorganic salts (soluble to acid) such as calcium carbonate, barium carbonate, magnesium carbonate, magnesium sulfate, and magnesium oxide etc., inorganic salts (soluble to alkali aqueous solution) such as alumina, silica gel, and silica sol etc., metals (soluble to acid and/or alkali) such as aluminum, zinc, tin, nickel, and iron etc., inorganic salts (soluble to water) aqueous solutions of sodium chloride, potassium chloride, ammonium chloride, sodium carbonate, sodium sulfate, and monobasic sodium phosphate etc., and water soluble organic compounds such as polyvinyl alcohol, and polyethylene glycol etc. can be used as the pore forming agent soluble in acid, alkali or water. Not only a single material but a plurality of these together can be effectively used.

In a manufacturing method of an electrode catalyst layer of the present invention, the catalyst material and/or the carbon particles which are embedded by the first polymer electrolyte can be obtained by coating the first catalyst ink, in which the first polymer electrolyte along with the catalyst material and/or the carbon particles are dispersed in a solvent, on a transfer sheet followed by drying. In addition, the carbon particles embedded by the polymer electrolyte can also be obtained directly by spraying the first catalyst ink into a dry air.

In a manufacturing method of an electrode catalyst layer of the present invention, when the electrode catalyst layer is manufactured using the second catalyst ink, in which the carbon particles and the catalyst material which is embedded in the first polymer electrolyte are dispersed in the solvent, or in which the catalyst material and the carbon particles which are embedded in the first polymer electrolyte are dispersed in the solvent, the second catalyst ink is coated on a substrate and dried to form the electrode catalyst layer. In the case where a gas diffusion layer or a transfer sheet is used as the substrate, a bonding process to bond electrode catalyst layers to both surfaces of the polymer electrolyte membrane, respectively, is performed. In addition, it is also possible in the present invention to use a polymer electrolyte membrane as the substrate and to directly coat the catalyst ink on both surfaces of the polymer electrolyte membrane to form an electrode catalyst layer on both surfaces of the polymer electrolyte membrane.

At this time, a doctor blade method, a dipping method, a screen printing method, a roll coating method and a spray method etc. can be used as the coating method. Among these, the spray method such as, for example, a pressure spray method, an ultrasonic spray method, and an electrostatic spray method etc. has an advantage that agglutination of the catalyst loaded carbons hardly occurs when drying the coated catalyst ink so that an electrode catalyst layer (sub-layer) has evenly distributed high density pores.

A gas diffusion layer, a transfer sheet or a polymer electrolyte membrane can also be used as the substrate in the manufacturing method of an MEA of the present invention.

The transfer sheet which is used as the substrate is principally made of a material having good transfer properties. For example, fluororesins such as ethylene tetrafluoroethylene copolymer (ETFE), tetrafluoroethylene hexafluoroethylene copolymer (FEP), tetrafluoroethylene perfluoroalkyl vinyl ether copolymer (PFA), and polytetrafluoroethylene (PTFE) etc. can be used. In addition, polymer sheets or polymer films such as polyimide, polyethylene terephthalate (PET), polyamide (nylon), polysulfone (PSF), polyethersulfone (PES), polyphenylene sulfide (PPS), polyether ether ketone (PEEK), polyetherimide (PEI), polyarylate (PAR), and polyethylene naphthalate (PEN) etc. can be used as the transfer sheet. In the case where such a transfer sheet is used as the substrate, it is possible to peel off and remove the transfer sheet after an electrode catalyst layer (sub-layer) is stuck to the polymer electrolyte membrane so as to make an MEA in which electrode catalyst layers are arranged on both sides of the polymer electrolyte membrane.

In addition, materials having gas diffusion properties and electric conductivity can be used as the gas diffusion layer. Specifically, a carbon cloth, a carbon paper and a porous carbon such as unwoven carbon fabric can be used as the gas diffusion layer. Such a gas diffusion layer can also be used as the substrate. In this case, the substrate which acts as the gas diffusion layer is not peeled off after an electrode catalyst layer is stuck to the polymer electrolyte membrane.

In addition, in the case where the gas diffusion layer is used as the substrate, a filling layer (or sealing layer) may preliminarily be formed on the gas diffusion layer before the catalyst ink is coated. The filling (or sealing) layer is formed to prevent the catalyst ink from seeping into the gas diffusion layer. If the filling layer is preliminarily formed, the catalyst ink is accumulated on the filling layer and a three-phase boundary is formed even when the amount of the catalyst ink is small. Such a filling layer can be formed, for example, by dispersing carbon particles in a fluororesin solution and sintering the solution at a temperature higher than the melting point of the fluororesin. Polytetrafluoroethylene (PTFE) etc. can be used as the fluororesin.

In addition, a carbon separator and a metal separator etc. can be used as the separator of the present invention. The separator may incorporate a gas diffusion layer. In the case where the separator or the electrode catalyst layer also performs the function of the gas diffusion layer, it is unnecessary to arrange any independent gas diffusion layers. A fuel cell can be fabricated by joining additional equipment such as gas supply equipment and cooling equipment etc. to an MEA having such components described above.

EXAMPLE

Examples and comparative examples of a manufacturing method of an electrode catalyst layer for a fuel cell of the present invention are described below. The present invention, however, is not limited to these examples.

<<Example 1>>, <<Example 2>> and <<Comparative example>> are sequentially described.

Example 1

Preparation of First Catalyst Ink

A catalyst material (TaCNO, specific surface area: 9 m$^2$/g) and a 20 wt%-solution of polymer electrolyte (Nafion® made by DuPont) were mixed with a solvent and a dispersion treatment was performed in a planetary ball mill (product name: P-7, by Fritch Japan Co., Ltd) to prepare a first catalyst ink. Balls and a pod which were made of zirconium were used for the ball mill. The catalyst ink had a composition ratio of 1:0.25 by weight with respect to the catalyst material relative to the polymer electrolyte. Ultrapure water and 1-propanol were blended together by a ratio of 1:1 by volume to use as the solvent and the catalyst ink included 14% by weight of solid content. A sheet of PTFE was used as a substrate for drying the first catalyst ink.

<Preparation of Catalyst Material Embedded in Polymer Electrolyte>

The first catalyst ink was coated on the substrate by a doctor blade. Subsequently, the catalyst ink was dried under atmosphere at a temperature of 80° C. for five minutes. Then, the resultant catalyst material embedded in the polymer electrolyte was collected from the substrate.

<Mixing Carbon Particles with Catalyst Material Embedded in Polymer Electrolyte, and Heating >

Carbon particles (Ketjen Black, made by Lion Corp., product name: EC-300J, specific surface area: 800 m$^2$/g) and the catalyst material embedded in the polymer electrolyte were mixed without a solvent by a planetary ball mill. Balls and a pod which were made of zirconium were used for the ball mill. Subsequently, the resultant mixture of the carbon particles and the catalyst material embedded in the polymer electrolyte received a heat treatment at 70° C. The mixture had a composition ratio of 1:1 by mass with respect to the carbon particles relative to the catalyst material embedded in the polymer electrolyte.

<Preparation of Second Catalyst Ink>

20 wt % of polymer electrolyte solution and the heated mixture of the carbon particles and the catalyst material embedded in the polymer electrolyte were mixed in a solvent. Then, a dispersion treatment was performed in a planetary ball mill to prepare a second catalyst ink. Balls and a pod which were made of zirconium were used for the ball mill. The second catalyst ink had a composition ratio of 1:1:0.8 with respect to the catalyst material, the carbon particles, and the polymer electrolyte. Ultrapure water and 1-propanol were blended together by a ratio of 1:1 by volume to use as the solvent. The catalyst ink included 14% by weight of solid content. A sheet of PTFE was used as a transfer sheet.

<Formation of Electrode Catalyst Layer>

The second catalyst ink was coated on the transfer sheet by a doctor blade. Subsequently, the ink was dried under atmosphere at 80° C. for five minutes. Then, an electrode catalyst layer 2 was formed on the air electrode side adjusting the layer thickness in such a way that 0.4 mg/cm$^2$ of catalyst were loaded on the layer.

Example 2

Preparation of First Catalyst Ink

Carbon particles (Ketjen Black, made by Lion Corp., product name: EC-300J, specific surface area: 800 m$^2$/g) and a 20 wt %-solution of polymer electrolyte (Nafion® made by DuPont) were mixed with a solvent and a dispersion treatment was performed in a planetary ball mill (product name: P-7, by Fritch Japan Co., Ltd) to prepare a first catalyst ink. Balls and a pod which were made of zirconium were used for the ball mill. The catalyst ink had a composition ratio of 1:0.5 by weight with respect to the carbon particles relative to the polymer electrolyte. Ultrapure water and 1-propanol were blended together by a ratio of 1:1 by volume to use as the solvent. A sheet of PTFE was used as a substrate for drying the first catalyst ink.

<Preparation of Carbon Particles Embedded in Polymer Electrolyte>

The first catalyst ink was coated on the substrate by a doctor blade. Subsequently, the catalyst ink was dried under atmosphere at a temperature of 80° C. for five minutes. Then, the resultant carbon particles embedded in the polymer electrolyte were collected from the substrate.

<Mixing Catalyst Material with Carbon Particles Embedded in Polymer Electrolyte, and Heating>

A catalyst material (TaCNO, specific surface area: 9 m$^2$/g) and the carbon particles embedded in the polymer electrolyte were mixed without a solvent by a planetary ball mill. Balls and a pod which were made of zirconium were used for the ball mill. Subsequently, the resultant mixture of the catalyst material and the carbon particles embedded in the polymer electrolyte received a heat treatment at 70° C. The mixture had a composition ratio of 1:1 by mass with respect to the carbon particles relative to the catalyst material embedded in the polymer electrolyte.

<Preparation of Second Catalyst Ink>

20 wt % of polymer electrolyte solution and the heated mixture of the catalyst material and the carbon particles embedded in the polymer electrolyte were mixed in a solvent. Then, a dispersion treatment was performed in a planetary ball mill to prepare a second catalyst ink. Balls and a pod which were made of zirconium were used for the ball mill. The second catalyst ink had a composition ratio of 1:1:0.8 with respect to the catalyst material, the carbon particles, and the polymer electrolyte. Ultrapure water and 1-propanol were blended together by a ratio of 1:1 by volume to use as the solvent. The catalyst ink included 14% by weight of solid content. A sheet of PTFE was used as a transfer sheet.

<Formation of Electrode Catalyst Layer>

The second catalyst ink was coated on the transfer sheet by a doctor blade. Subsequently, the ink was dried under atmosphere at 80° C. for five minutes. Then, an electrode catalyst layer 2 was formed on the air electrode side adjusting the layer thickness in such a way that 0.4 mg/cm$^2$ of catalyst were loaded on the layer.

Comparative Example

Preparation of Catalyst Ink

A catalyst material, carbon particles and a 20 wt %-solution of polymer electrolyte were mixed with a solvent and a dispersion treatment was performed in a planetary ball mill to prepare a catalyst ink. Balls and a pod which were made of zirconium were used for the ball mill. The catalyst ink had a composition ratio of 1:1:0.8 by weight with respect to a ratio among the catalyst material, the carbon particles and the polymer electrolyte. Ultrapure water and 1-propanol were blended together by a ratio of 1:1 by volume to use as the solvent. The catalyst ink included 14% by weight of solid content. A sheet of PTFE was used as a transfer sheet similar to the case of examples.

<Formation of Electrode Catalyst Layer>

The catalyst ink was coated on the transfer sheet by a doctor blade and dried under atmosphere at 80° C. for five minutes the same as in the examples. Then, an electrode catalyst layer 2 was formed on the air electrode side adjusting the layer thickness in such a way that 0.4 mg/cm$^2$ of catalyst were loaded on the layer.

<Formation of Electrode Catalyst Layer for Fuel Electrode>

A platinum loaded carbon on which 50% by mass of platinum was loaded (product name: TEC10E50E, made by Tanaka Kikinzoku Kogyo KK) and 20% by mass of polymer electrolyte solution were mixed with a solvent and a dispersion treatment was performed in a planetary ball mill to prepare a catalyst ink. This time, the catalyst ink was selectively obtained as a product in the case where the dispersion period was 60 minutes. The catalyst ink had a composition ratio of 1:1 by mass with respect to carbons in the platinum loaded carbon and polymer electrolyte. In addition, the catalyst ink included 10% by weight of solid content. The catalyst ink was coated on a substrate and dried in the same way as in the case of the electrode catalyst layer 2. Then, an electrode catalyst layer 3 was formed on the fuel electrode side adjusting the layer thickness in such a way that 0.3 mg/cm$^2$ of catalyst were loaded on the layer.

<Fabrication of Membrane Electrode Assembly>

Both a substrate on which the electrode catalyst layer 2 for the air electrode side was formed in <<Example 1>>, <<Example 2>> or <<Comparative example>>, and a substrate on which the electrode catalyst layer 3 for the fuel electrode side was formed were punched in a 5 cm² square shape. The resulting transfer sheets were arranged facing each side of a polymer electrolyte membrane (Nafion® 212, made by DuPont) and pressed at 130° C. for ten minutes to obtain a membrane electrode assembly 12. Then, the membrane electrode assembly 12 was arranged between carbon cloths 4 and 5 on which a filling layer was formed respectively as a gas diffusion layer and further interposed between a pair of separators 10 to obtain a unit cell of a fuel cell.

<Power Generation Performance>
Evaluation Conditions:

Power generation performance was measured using GFT-SGI, a fuel cell test system made by Toyo Corporation under a condition that a cell temperature was at 80° C. and the anode and the cathode were 100% RH. Pure hydrogen was used as the fuel gas while pure oxygen was used as the oxidant gas. The gases were controlled to flow at a constant rate.

Figure 3:
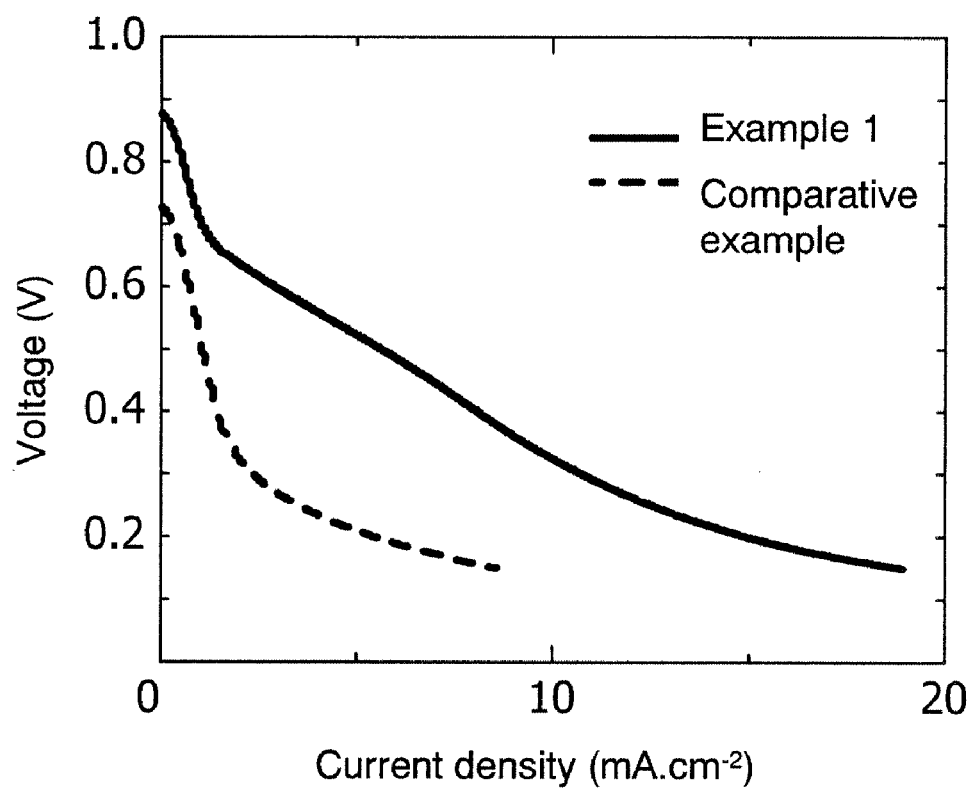
FIG. 3 shows power generation performance of a membrane electrode assembly manufactured in Example 1 and Comparative example.

Measurement Result:

FIG. 3 shows power generation performances of membrane electrode assemblies manufactured in <Example 1> and <Comparative example>. A solid line in FIG. 3 is a power generation performance of the membrane electrode assembly of <Example 1> whereas a doted line in FIG. 3 is a power generation performance of the membrane electrode assembly of <Comparative example>.

It is confirmed from FIG. 3 that the membrane electrode assembly made in <Example 1> had superior power generation performance to the one made in <Comparative example>. This seems to be because the active reaction points were increased in <Example 1>, in which the catalyst material was preliminarily embedded in the polymer electrolyte, since proton conductivity was improved on the surface of the polymer electrolyte. On the other hand, it seems that proton conductivity was insufficient on the surface of the catalyst material in <Comparative example>, in which the catalyst material, the carbon particles and the polymer electrolyte are dispersed in the solvent in a single step, since the polymer electrolyte was adsorbed more to the carbon particles, which have superior specific surface area, than to the catalyst material.

In addition, the membrane electrode assembly made in <Example 2> also had superior power generation performance to one made in <Comparative example>. Specifically, the membrane electrode assembly made in <Example 2> provides 1.8 times more power as that in <Comparative example> at around 0.6 V. This may be because proton conductivity on a surface of the catalyst material is improved by a reduced specific surface area of the carbon particles so that active reaction points are increased in <Example 2>. On the other hand, it seems that proton conductivity was insufficient on the surface of the catalyst material in <Comparative example>, in which the catalyst material, the carbon particles and the polymer electrolyte are dispersed in the solvent in a single step, since the polymer electrolyte was adsorbed more to the carbon particles, which have superior specific surface area, than to the catalyst material.

INDUSTRIAL APPLICABILITY

The present invention includes a method for manufacturing an electrode catalyst layer which includes catalyst material, carbon particles and polymer electrolyte, the method which has a feature of arranging preliminarily a process of embedding the catalyst material, which has a smaller specific surface area than the carbon particles, in the polymer electrolyte. This feature serves to improve proton conductivity of a surface of catalyst material so that active reaction points are increased, thereby making it possible to provide a PEMFC with a high level of output performance.

In addition, the present invention includes a method for manufacturing an electrode catalyst layer which includes catalyst material, carbon particles and polymer electrolyte, the method which has a feature of arranging preliminarily a process of embedding the carbon particles, which have a larger specific surface area than the catalyst material, in the polymer electrolyte. This process of reducing specific surface area of carbon particles serves to improve proton conductivity of a surface of the catalyst material when forming an electrode catalyst layer. As a result, active reaction points are increased and it becomes possible to provide an electrode catalyst layer with a high level of output performance and a method for manufacturing thereof as well as a membrane electrode assembly and a fuel cell which employ the electrode catalyst layer.

The present invention has a high level of industrial applicability because of such a remarkable result that a non-precious metal oxide based catalyst material employed in the electrode catalyst layer is used more effectively than in a conventional manufacturing method.

What is claimed is:

1. A method for manufacturing an electrode catalyst layer of a fuel cell, said electrode catalyst layer comprising a catalyst material, carbon particles, a first polymer electrolyte and a second polymer electrolyte, a specific surface area of said catalyst material being smaller than a specific surface area of said carbon particles, the method comprising:
  (1): preparing a first catalyst ink, in which said first polymer electrolyte and said catalyst material are dispersed in a solvent in order to embed said catalyst material in said first polymer electrolyte;
  (2): drying said first catalyst ink so that said catalyst material embedded in said first polymer electrolyte is obtained;
  (3): preparing a second catalyst ink, in which said catalyst material embedded in said first polymer electrolyte, said carbon particles and said second polymer electrolyte are dispersed in a solvent; and
  (4): coating said second catalyst ink on a substrate which is a gas diffusion layer, a transfer sheet or a polymer electrolyte membrane so as to fabricate said electrode catalyst layer, wherein
said catalyst material is not preliminarily loaded on or supported by said carbon particles in said (1), and wherein said carbon particles are not preliminarily embedded in said first polymer electrolyte in said (3).

2. The method according to claim 1, wherein a ratio by weight between said catalyst material and said first polymer electrolyte in said "catalyst material embedded in said first polymer electrolyte" is in the range of 1:0.01 to 1:30 in said (2).

3. The method according to claim 2, wherein said drying of said first catalyst ink in said (2) is performed at a temperature in the range of 30-140° C.

4. The method according to claim 3 further comprising in said (3):
  (A): preliminarily mixing together said carbon particles with said catalyst material embedded in said first polymer electrolyte without adding the solvent.

5. The method according to claim 4 further comprising in said (3):
- (B): heating said carbon particles and said catalyst material embedded in said first polymer electrolyte which have been mixed together in said (A) at a temperature in the range of 50-180° C.

6. The method according to claim 5, wherein said catalyst material includes at least one transition metal element selected from the group consisting of Ta, Nb, Ti and Zr.

7. The method according to claim 6, wherein said catalyst material is a partially-oxidized carbonitride of the at least one transition metal element.

8. The method according to claim 7, wherein said catalyst material includes Ta.

9. A method for manufacturing an electrode catalyst layer of a fuel cell, said electrode catalyst layer comprising a catalyst material, carbon particles, a first polymer electrolyte and a second polymer electrolyte, a specific surface area of said catalyst material being smaller than a specific surface area of said carbon particles, the method comprising:

- (1): preparing a first catalyst ink, in which said first polymer electrolyte and said carbon particles are dispersed in a solvent in order to embed said carbon particles in said first polymer electrolyte;
- (2): drying said first catalyst ink so that said carbon particles embedded in said first polymer electrolyte is obtained;
- (3): preparing a second catalyst ink, in which said carbon particles embedded in said first polymer electrolyte, said catalyst material and said second polymer electrolyte are dispersed in a solvent; and
- (4): coating said second catalyst ink on a substrate which is a gas diffusion layer, a transfer sheet or a polymer electrolyte membrane so as to fabricate said electrode catalyst layer, wherein said catalyst material is not preliminarily loaded on or supported by said carbon particles in said (1), and wherein said catalyst material is not preliminarily embedded in said first polymer electrolyte in said (3).

* * * * *